(12) United States Patent
Maguire et al.

(10) Patent No.: US 10,446,893 B2
(45) Date of Patent: Oct. 15, 2019

(54) ELECTRIFIED VEHICLE BATTERY PACKS WITH BATTERY ATTACHMENT FEATURES

(71) Applicant: Ford Global Technologies, LLC, Dearborn, MI (US)

(72) Inventors: Patrick Daniel Maguire, Ann Arbor, MI (US); Hyung Min Baek, Fremont, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 194 days.

(21) Appl. No.: 15/412,516

(22) Filed: Jan. 23, 2017

(65) Prior Publication Data

US 2018/0212292 A1 Jul. 26, 2018

(51) Int. Cl.
| | |
|---|---|
| *H01M 10/655* | (2014.01) |
| *H01M 10/6554* | (2014.01) |
| *H01M 10/613* | (2014.01) |
| *H01M 10/625* | (2014.01) |
| *B60K 6/28* | (2007.10) |
| *B60L 7/10* | (2006.01) |
| *H01M 2/10* | (2006.01) |
| *H01M 10/6556* | (2014.01) |
| *B60L 58/26* | (2019.01) |
| *B60L 50/60* | (2019.01) |
| *B60K 6/44* | (2007.10) |

(52) U.S. Cl.
CPC ........... *H01M 10/6554* (2015.04); *B60K 6/28* (2013.01); *B60L 7/10* (2013.01); *B60L 50/66* (2019.02); *B60L 58/26* (2019.02); *H01M 2/1072* (2013.01); *H01M 10/613* (2015.04); *H01M 10/625* (2015.04); *H01M 10/6556* (2015.04); *B60K 6/44* (2013.01); *B60L 2240/545* (2013.01); *B60Y 2200/92* (2013.01); *B60Y 2306/05* (2013.01); *B60Y 2400/112* (2013.01); *H01M 2/1016* (2013.01); *H01M 2/1061* (2013.01); *H01M 2220/20* (2013.01); *Y02T 10/705* (2013.01); *Y02T 10/7005* (2013.01); *Y10S 903/907* (2013.01)

(58) Field of Classification Search
None
See application file for complete search history.

(56) References Cited

U.S. PATENT DOCUMENTS

| | | | |
|---|---|---|---|
| 6,224,998 | B1 | 5/2001 | Brouns et al. |
| 8,231,996 | B2 | 7/2012 | Howard et al. |
| 8,861,202 | B2 | 10/2014 | Nassoiy |
| 2007/0177356 | A1 | 8/2007 | Panek |
| 2008/0096072 | A1* | 4/2008 | Fukusako ........... H01M 2/1016 429/96 |
| 2009/0092890 | A1* | 4/2009 | Wu ...................... H01M 2/1005 429/99 |

(Continued)

FOREIGN PATENT DOCUMENTS

| | | |
|---|---|---|
| DE | 102009045012 | 3/2011 |
| WO | 20120191459 | 7/2012 |

*Primary Examiner* — Jeremiah R Smith
(74) *Attorney, Agent, or Firm* — Carlson, Gaskey & Olds (57) ABSTRACT

A battery pack includes a heat exchanger plate having a first attachment feature and a battery assembly having a second attachment feature configured to engage the first attachment feature as the battery assembly is moved against the heat exchanger plate to thermally couple the battery assembly to the heat exchanger plate.

13 Claims, 7 Drawing Sheets

(56) References Cited

U.S. PATENT DOCUMENTS

| | | | |
|---|---|---|---|
| 2011/0003187 A1* | 1/2011 | Graaf | H01M 10/625 |
| | | | 429/120 |
| 2011/0269008 A1* | 11/2011 | Houchin-Miller | |
| | | | H01M 2/1077 |
| | | | 429/120 |
| 2012/0196168 A1* | 8/2012 | Hirsch | H01M 2/1083 |
| | | | 429/99 |
| 2012/0224326 A1* | 9/2012 | Kohlberger | H01M 2/1077 |
| | | | 361/699 |
| 2013/0095360 A1* | 4/2013 | Niedzwiecki | H01M 2/1077 |
| | | | 429/99 |
| 2014/0193683 A1 | 7/2014 | Mardall et al. | |
| 2015/0093613 A1 | 4/2015 | Obasih et al. | |
| 2015/0171492 A1* | 6/2015 | Ramsayer | H01M 2/0217 |
| | | | 429/120 |
| 2016/0020496 A1* | 1/2016 | Burrows | H01M 10/482 |
| | | | 429/62 |
| 2019/0044111 A1* | 2/2019 | Morita | H01M 2/1016 |

* cited by examiner

ELECTRIFIED VEHICLE BATTERY PACKS WITH BATTERY ATTACHMENT FEATURES

TECHNICAL FIELD

This disclosure relates to battery packs for electrified vehicles. An exemplary battery pack includes an enclosure, a battery assembly, and a heat exchanger plate. At least two of the enclosure, the battery assembly, and the heat exchanger plate may include attachment features for both mechanically securing the battery assembly to the enclosure and thermally coupling the battery assembly to the heat exchanger plate.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that store energy for powering these electrical loads. The battery cells release heat during charging and discharging operations. It is often desirable to dissipate this heat from the battery pack to improve capacity and life of the battery cells. Heat exchanger plates, often referred to as "cold plates," may be used for this purpose. Gaps between the battery cells and the heat exchanger plate can reduce the thermal effectiveness of the heat exchanger plate.

SUMMARY

A battery pack according to an exemplary aspect of the present disclosure includes a heat exchanger plate having a first attachment feature and a battery assembly having a second attachment feature configured to engage the first attachment feature as the battery assembly is moved against the heat exchanger plate to thermally couple the battery assembly to the heat exchanger plate.

In a further non-limiting embodiment of the foregoing battery pack, the first attachment feature includes a clip arm and the second attachment feature includes an aperture.

In a further non-limiting embodiment of either of the foregoing battery packs, a hook portion of the clip arm is received in the aperture.

In a further non-limiting embodiment of any of the foregoing battery packs, an overhang surface of the hook portion abuts a surface that circumscribes the aperture.

In a further non-limiting embodiment of any of the foregoing battery packs, the clip arm protrudes upwardly from an outer surface of the heat exchanger plate and the aperture is formed in a sidewall of the battery assembly.

In a further non-limiting embodiment of any of the foregoing battery packs, the first attachment feature is flexible between a first position in which the first attachment feature is engaged with the second attachment feature and a second position in which the first attachment features is disengaged from the second attachment feature.

In a further non-limiting embodiment of any of the foregoing battery packs, the first attachment feature is a slot and the second attachment feature is a clip arm.

In a further non-limiting embodiment of any of the foregoing battery packs, the slot is formed through the heat exchanger plate and the clip arm protrudes from a sidewall of the battery assembly.

In a further non-limiting embodiment of any of the foregoing battery packs, a hook portion of the clip arm is received through the slot.

In a further non-limiting embodiment of any of the foregoing battery packs, an overhang surface of the hook portion abuts against a lip of the heat exchanger plate.

In a further non-limiting embodiment of any of the foregoing battery packs, the heat exchanger plate is received against a portion of an enclosure.

In a further non-limiting embodiment of any of the foregoing battery packs, the portion is a tray and the heat exchanger plate is received against a floor of the tray.

In a further non-limiting embodiment of any of the foregoing battery packs, the portion of the enclosure includes a third attachment feature configured to engage a fourth attachment feature of the battery assembly.

In a further non-limiting embodiment of any of the foregoing battery packs, the third attachment feature includes a clip arm and the fourth attachment feature includes an aperture formed in a sidewall of the battery assembly.

A method according to another exemplary aspect of the present disclosure includes engaging a first attachment feature of one of a battery assembly and a heat exchanger plate with a second attachment feature of the other of the battery assembly and the heat exchanger plate as the battery assembly is moved into contact with the heat exchanger plate.

In a further non-limiting embodiment of the foregoing method, the first attachment feature is a clip arm of the battery assembly and the second attachment feature is a slot of the heat exchanger plate.

In a further non-limiting embodiment of either of the foregoing methods, the first attachment feature is a clip arm of the heat exchanger plate and the second attachment feature is an aperture formed in a sidewall of the battery assembly.

In a further non-limiting embodiment of any of the foregoing methods, the method includes engaging a third attachment feature of one of a second battery assembly and the heat exchanger plate with fourth attachment feature of the other of the second battery assembly and the heat exchanger plate as the second battery assembly is moved into contact with the heat exchanger plate.

In a further non-limiting embodiment of any of the foregoing methods, the third attachment feature is a clip arm of the second battery assembly and the fourth attachment feature is a slot of the heat exchanger plate.

In a further non-limiting embodiment of any of the foregoing methods, the third attachment feature is a clip arm of the heat exchanger plate and the fourth attachment feature is an aperture formed in a sidewall of the second battery assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details various battery pack designs for use within electrified vehicles. In a first non-limiting embodiment, a battery pack includes an enclosure, a heat exchanger plate within the enclosure, and a battery assembly positioned against the heat exchanger plate. A first attachment feature of the battery assembly is received through a slot of the heat exchanger plate to secure the battery assembly to the enclosure. In another non-limiting embodiment, a first attachment feature of the heat exchanger plate engages a second attachment feature of the battery assembly for thermally coupling the battery assembly to the heat exchanger plate as the two components are moved against one another. These and other features are discussed in greater detail in the following paragraphs of this detailed description.

Figure 1:
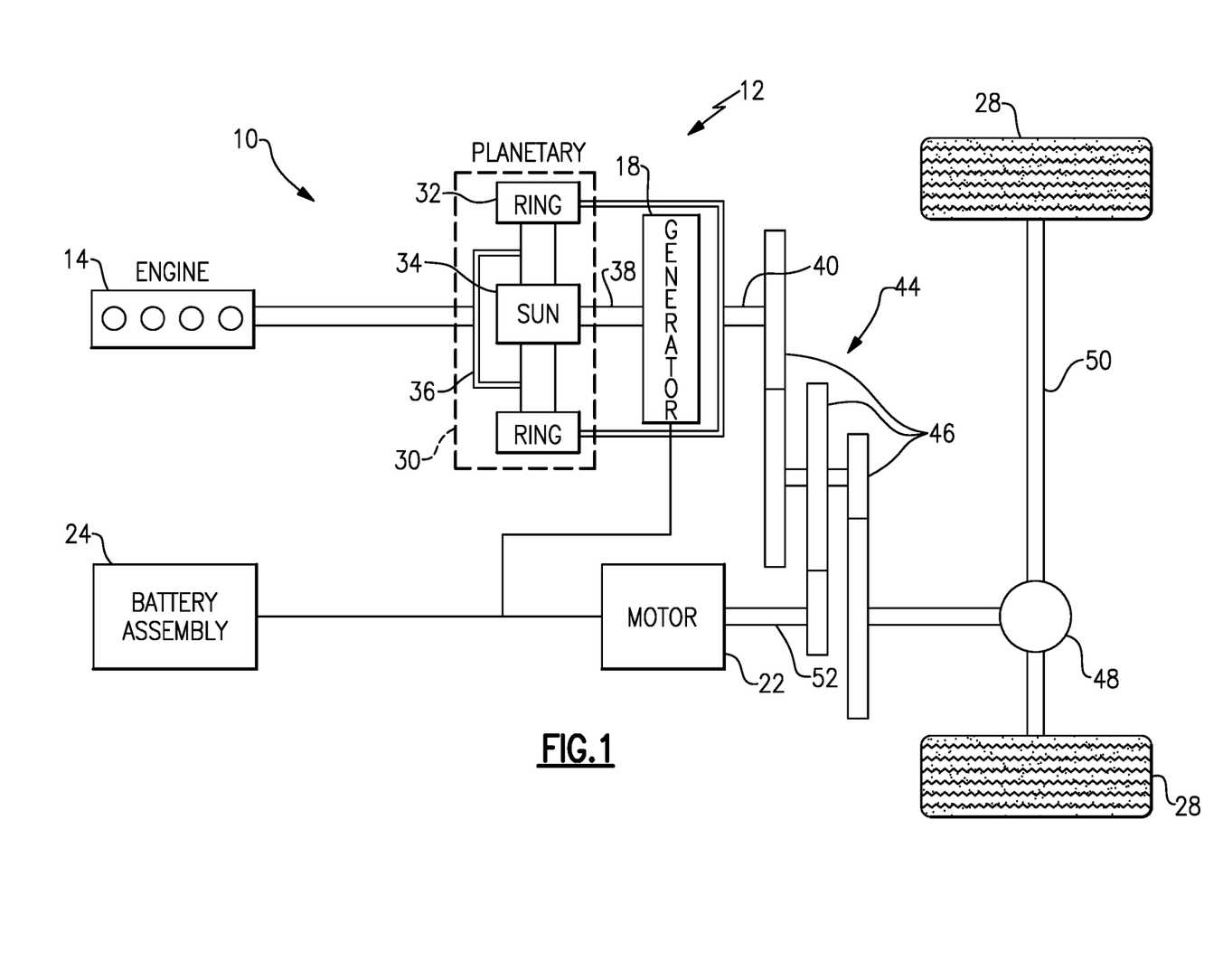
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
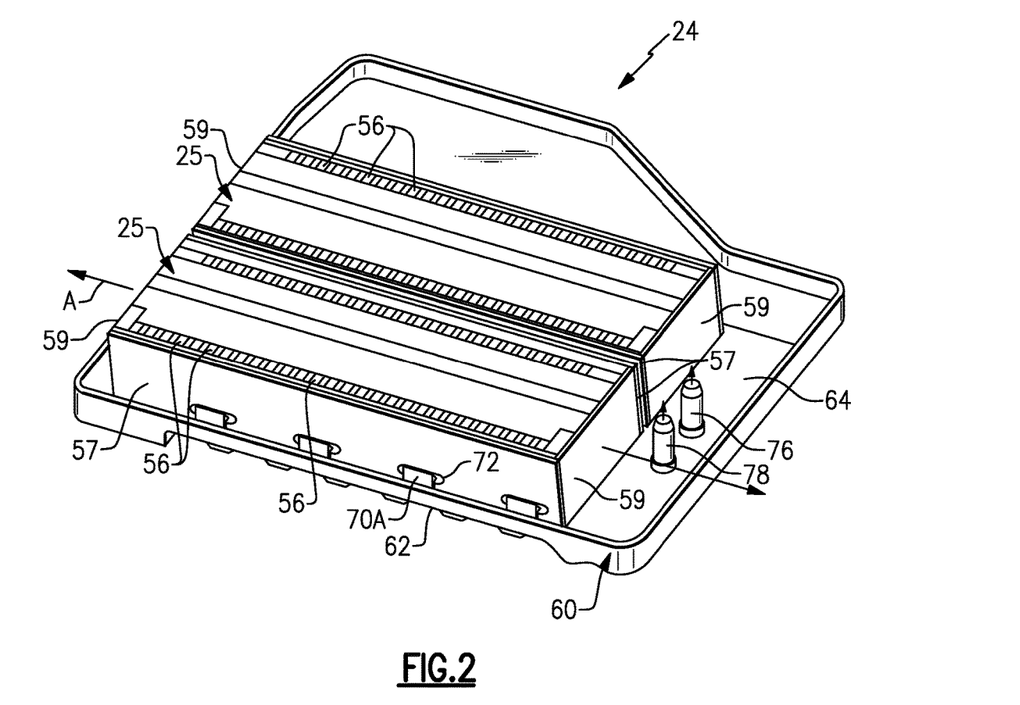
FIG. 2 illustrates a battery pack of an electrified vehicle.

FIG. 2 illustrates a battery pack 24 that can be employed within an electrified vehicle. For example, the battery pack 24 could be part of the electrified vehicle 12 of FIG. 1. The battery pack 24 includes a plurality of battery cells 56 that store electrical power for powering various electrical loads of the electrified vehicle 12. Although a specific number of battery cells 56 are depicted in FIG. 2, the battery pack 24 could employ a greater or fewer number of battery cells within the scope of this disclosure. In other words, this disclosure is not limited to the exact configuration shown in FIG. 2.

The battery cells 56 may be stacked side-by-side along a longitudinal axis A to construct one or more groupings of battery cells 56, sometimes referred to as "cell stacks." The battery pack 24 can include one or more separate groupings of battery cells 56. The battery cells 56 may include any geometry (prismatic, cylindrical, pouch, etc.) and/or any chemistry (lithium-ion, nickel-metal hydride, lead-acid, etc.).

The battery cells 56, along with any support structures (e.g., frames, spacers, rails, walls, plates, bindings, etc.), may collectively be referred to as a battery assembly 25. The battery cells 56 of each battery assembly 25 are retained relative to one another by opposing sidewalls 57 and endwalls 59. Although the battery pack 24 of FIG. 2 is depicted as including two battery assemblies 25, the battery pack 24 could include a greater or fewer number of battery assemblies within the scope of this disclosure. In addition, although depicted as extending longitudinally inside the battery pack 24, the battery assemblies 25 could alternatively be arranged to extend laterally inside the battery pack 24.

An enclosure 60 houses each battery assembly 25 of the battery pack 24. The enclosure 60 is a sealed enclosure that includes at least a tray 62. Although not shown, a cover may be secured to the tray 62 to enclose and seal the battery assemblies 25 of the battery pack 24. The enclosure 60 may be a polymer-based enclosure, such as a thermoplastic or thermoset. The exemplary enclosure is a neat, or pure, thermoplastic. Other examples could include other types of thermoplastics and thermosets with structural fibers and or fillers added.

The battery pack 24 may additionally include a heat exchanger plate 64. The heat exchanger plate 64 is positioned between the tray 62 and the battery assemblies 25. In a non-limiting embodiment, bottom surfaces of each battery assembly 25 are in direct contact with the heat exchanger plate 64. In a non-limiting embodiment, the heat exchanger plate 64 is made of aluminum. However, the heat exchanger plate 64 could be made from any conductive material, including any metallic conductive materials or polymeric conductive materials.

The heat exchanger plate 64 is equipped with features for thermally managing the battery cells 56 of each battery assembly 25. For example, heat may be generated and released by the battery cells 56 during charging operations, discharging operations, extreme ambient conditions, or other conditions. It may be desirable to remove the heat generated by the battery cells 56 from the battery pack 24 to improve the life of the battery cells 56. The heat exchanger plate 64 is configured to conduct the heat out of the battery cells 56. In other words, the heat exchanger plate 64 acts as a heat sink to remove heat from the heat sources (i.e., the battery cells 56). The heat exchanger plate 64 can alternatively be employed to heat the battery cells 56, such as during extremely cold ambient conditions.

Figure 3:
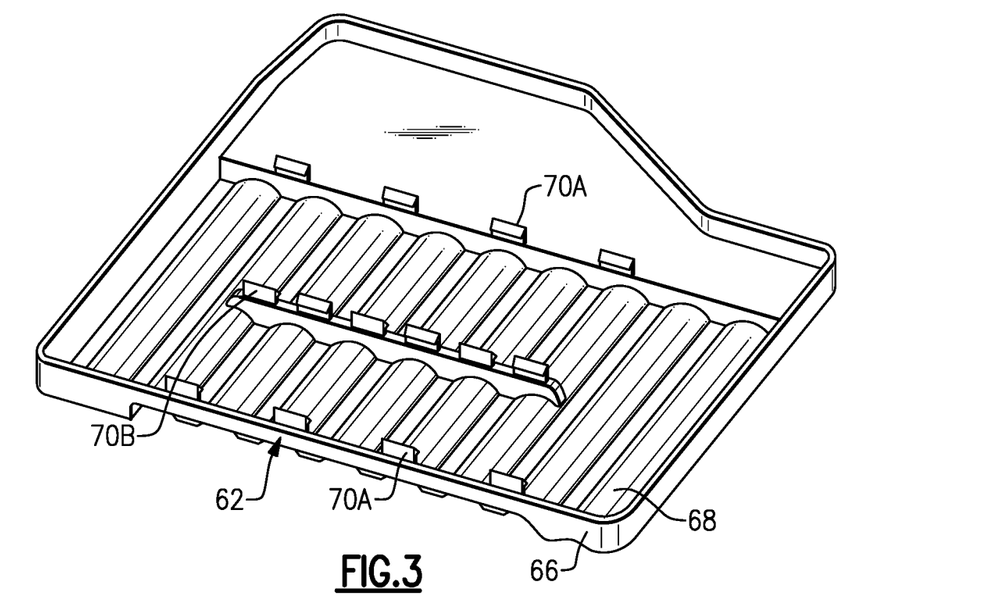
FIG. 3 illustrates select portions of an enclosure of the battery pack of FIG. 2.
Figure 4:
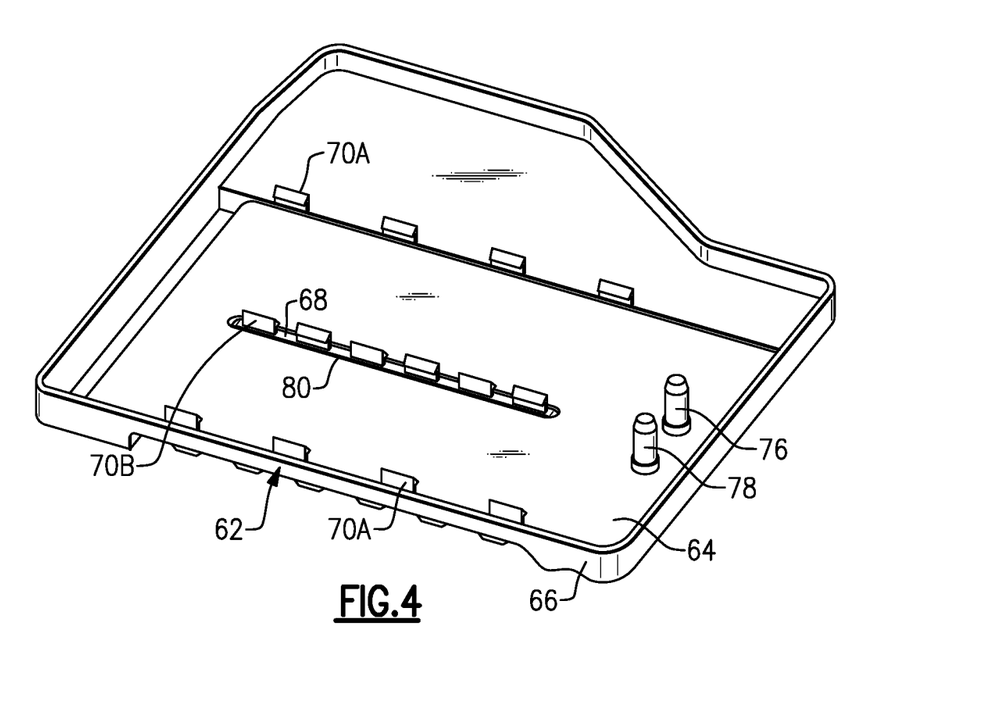
FIG. 4 illustrates a heat exchanger plate received against the portions of the enclosure of FIG. 3.

FIGS. 3 and 4 illustrate additional features of the battery pack 24 of FIG. 2. FIG. 3 illustrates the tray 62 of the enclosure 60 with the heat exchanger plate 64 and the battery assemblies 25 removed for clarity, and FIG. 4 illustrates the relationship between the tray 62 and the heat exchanger plate 64 with the battery assemblies 25 removed for clarity.

Referring first to FIG. 3, the tray 62 generally includes sidewalls 66 extending from a floor 68. The tray 62 may additionally include a plurality of first attachment features 70A, 70B that engage second attachment features 72 of the battery assemblies 25 to secure the battery assemblies 25 to the enclosure 60 (as shown in FIG. 2, for example). The first attachment features 70A, 70B are integrally formed as part of the tray 62. The first attachment features 70A, 70B can be molded together with the other portions of the tray 62, for example.

The first attachment features 70A, 70B may be arranged in one or more rows within the enclosure 60. In a non-limiting embodiment, the first attachment features 70A protrude upwardly from the sidewalls 66 of the tray 62, and the first attachment features 70B protrude upwardly from a section of the floor 68 of the tray 62. In another non-limiting embodiment, the first attachment features 70A are generally located along an outer perimeter of the location where the battery assemblies 25 will reside, whereas the first attachment features 70B are generally located more toward the interior of the tray 62.

Referring now primarily to FIGS. 3 and 4, the heat exchanger plate 64 may be positioned against the floor 68 of the tray 62. In the installed position, the battery assemblies 25 both rest on top of the heat exchanger plate 64 (as shown in FIG. 2, for example). In other words, the heat exchanger plate 64 is configured to thermally manage both battery assemblies 25 of the battery pack 24.

Figure 5:
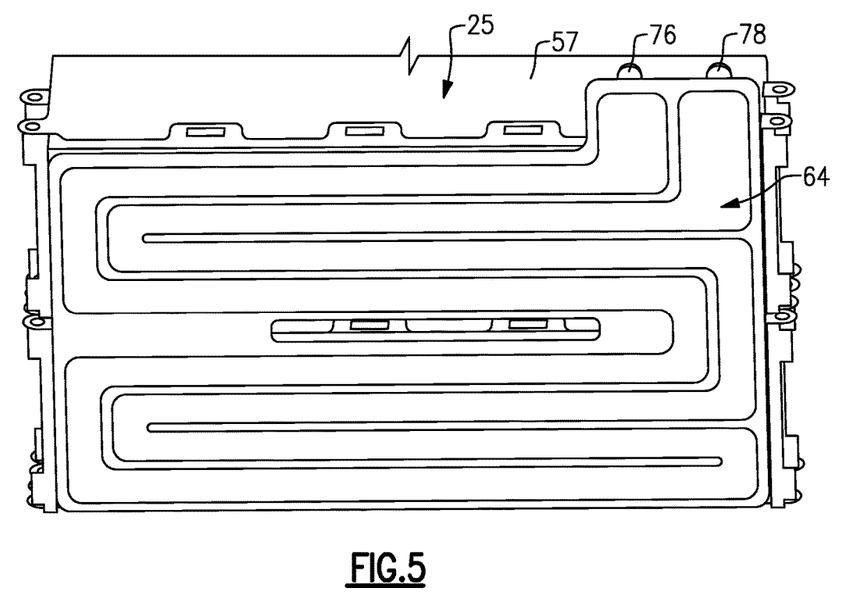
FIG. 5 illustrates another exemplary heat exchanger plate.

A fluid can be circulated through internal channels or plenums in the heat exchanger plate 64 to manage thermal energy levels of the battery assemblies 25. The heat exchanger plate 64 includes an inlet 76 and an outlet 78 that can communicate the fluid into and out of the internal channels. Heat from the battery cells 56 is conducted out of the cells and into the heat exchanger plate 64 and is then convected into the fluid to remove the heat away from the battery cells 56. In a non-limiting embodiment, the inlet 76 and the outlet 78 are located near the endwalls 59 of the battery assemblies 25 (see, e.g., FIG. 2). In another non-limiting embodiment, the inlet 76 and the outlet 78 of the heat exchanger plate 64 are located to a side of the battery assemblies, or adjacent a sidewall 57 of one of the battery assemblies 25 (see, e.g., FIG. 5).

Figure 6A:
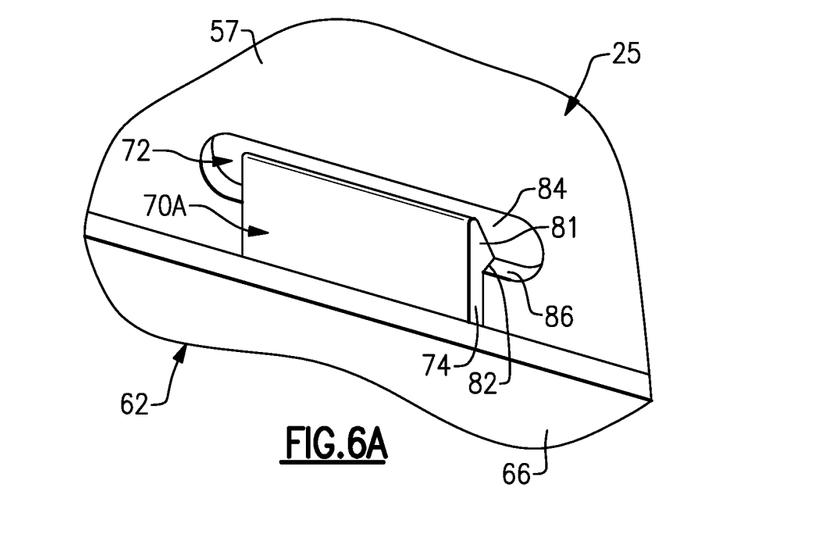
FIGS. 6A and 6B schematically illustrate attachment features of the battery pack of FIG. 2.
Figure 6B:
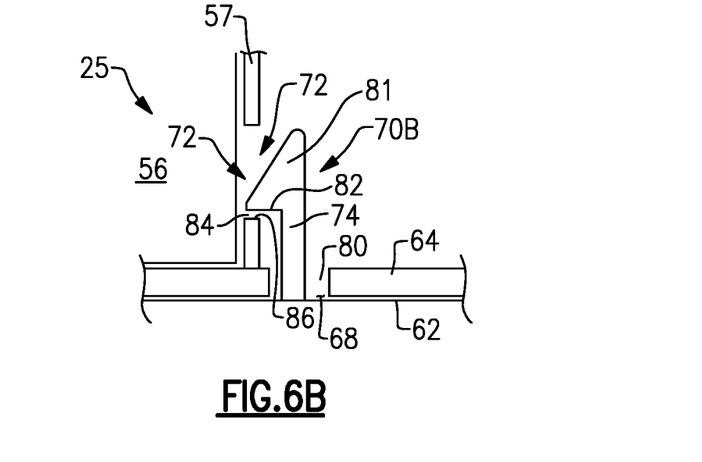

FIGS. 6A and 6B, with continued reference to FIGS. 2-5, illustrate the relationship between the first attachment features 70A, 70B and the second attachment features 72 for securing the battery assemblies 25 to the enclosure 60 of the battery pack 24. FIG. 6A shows a first attachment feature 70A engaged with a second attachment feature 72 of a battery assembly 25, whereas FIG. 6B shows a first attachment feature 70B engaged with a second attachment feature 72 of the battery assembly 25. Providing the first attachment features 70A at a periphery of the tray 62 and the first attachment features 70B at an interior of the tray 62 enables retention of the battery assemblies 25 at both sidewalls 57, including internal facing sidewalls that face toward an adjacent battery assembly (as best shown, for example, in FIG. 2).

Referring first to FIG. 6A, the first attachment feature 70A may include a clip arm 74 having a half-arrow head profile. In particular, the clip arm 74 of the first attachment feature 70A extends from the sidewall 66 of the tray 62 and includes a hook portion 81 having an overhang surface 82 facing the floor 68 of the tray 62. The second attachment feature 72 may be provided by an aperture 84 or slit disposed within the sidewalls 57 of the battery assemblies 25. When the battery assemblies 25 are in the installed position shown in FIG. 2, the first attachment features 70A engage a respective one of the second attachment features 72 such that the hook portions 81 extends into the apertures 84 and the overhang surfaces 82 rest against surfaces 86 of the second attachment feature 72 that circumscribe the apertures 84. Although shown in the sidewalls 57, the second attachment features 72 could alternatively be formed in the endwalls 59 of the battery assemblies 25.

Referring now to FIG. 6B, the first attachment features 70B may also include clips arms 74 having a half-arrow head profile, and the second attachment features 72 can be provided by an additional aperture 84. The first attachment features 70B extend from the floor 68 of the tray 62 and extend through a slot 80 of the heat exchanger plate 64. The slot 80 is shown in cross-section in FIG. 6B; however, a perspective view of the slot 80 is illustrated in FIG. 4. The heat exchanger plate 64 could include one or more slots 80 for accommodating the first attachment features 70B through the heat exchanger plate 64.

When the battery assemblies 25 are in the installed position shown in FIG. 2, the clip arms 74 of the first attachment features 70B extend through the slot 80 and can each engage a respective one of the second attachment features 72 such that hook portions 81 extends into the apertures 84 and the overhang surfaces 82 rests against surfaces 86 of the second attachment feature 72 that circumscribe the apertures 84.

Figure 7A:
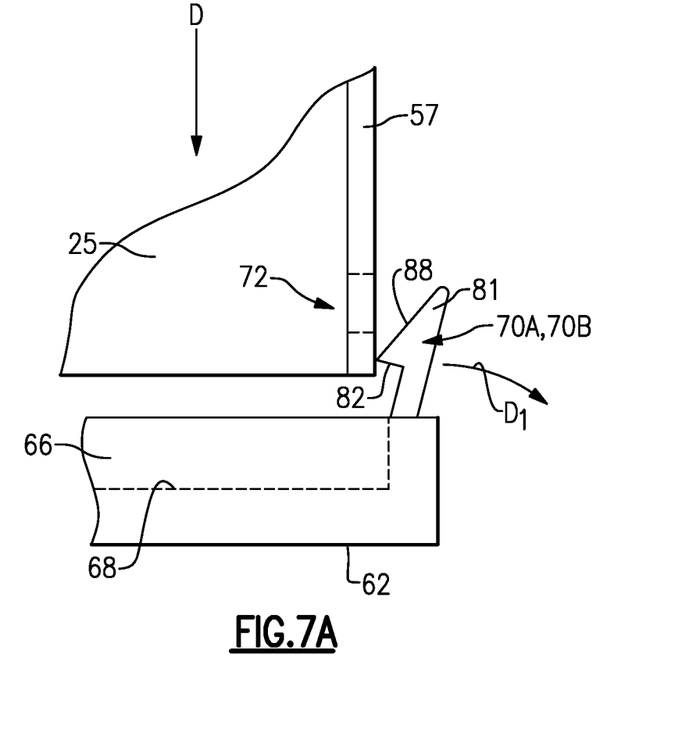
FIGS. 7A and 7B schematically illustrate additional features of the attachment features of FIGS. 6A, 6B.

The first attachment features 70A, 70B are each flexible between first and second positions to simplify their engagement with the second attachment features 72. For example, as shown in FIG. 7A, movement of one of the battery assemblies 25 toward the floor 68 of the tray 62 in a direction D causes the battery assembly 25 to slide along a ramped surface 88 of the hook portion 81 of the first attachment feature 70A, 70B, which leverages the flexibility of the thermoplastic and forces the first attachment feature 70A, 70B to flex outward away from the battery assembly 25 in a direction D1. The bottom edges of the sidewalls 57 of the battery assembly 25 that initially contact the ramped surface 88 can be bent or ramped inward toward the axial center of the battery assemblies 25 to facilitate movement of the sidewalls 57 along the ramped surface 88. As the battery assembly 25 continues to move in the direction D, the overhang surface 82 eventually aligns with the second attachment feature 72.

Figure 7B:
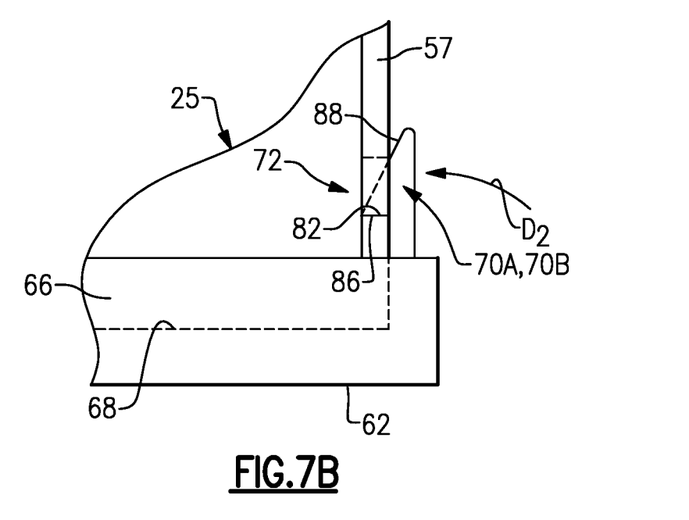

As shown in FIG. 7B, when aligned, the first attachment feature 70A, 70B snaps back in a direction D2 into the second attachment feature 72 to return the first attachment feature 70A, 70B to an unflexed position. The overhang surface 82 of the first attachment feature 70A, 70B then rests against the surface 86 of the second attachment feature 72. Contact between the overhang surface 82 and the surface 86 resists movement of the battery assembly 25 away from the floor 68 and holds the heat exchanger plate 64 in position between the battery assembly 25 and the tray 62.

Figure 8:
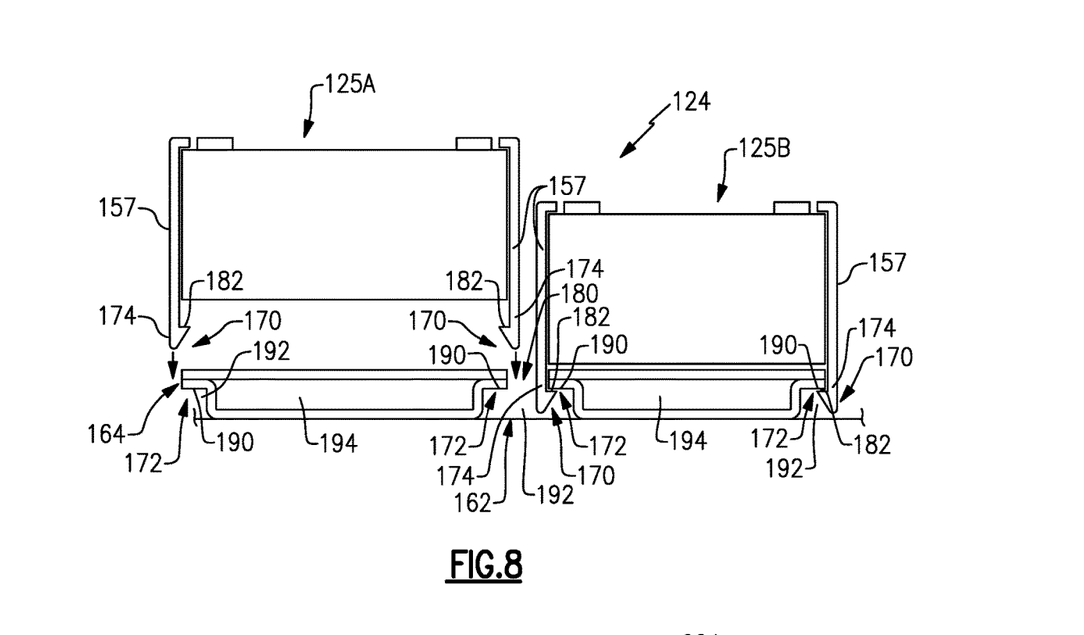
FIG. 8 illustrates another exemplary battery pack.

FIG. 8 is a cross-sectional view of another exemplary battery pack 124. The battery pack 124 includes a tray 162, a heat exchanger plate 164, and one or more battery assemblies (here, a first battery assembly 125A and a second battery assembly 125). In an assembled position, the battery assemblies 125A, 125B both rest atop the heat exchanger plate 164.

In this exemplary embodiment, the battery assemblies 125A, 125B include a plurality of first attachment features 170 that engage second attachment features 172 of the heat exchanger plate 164 to secure the battery assemblies 125A, 125B relative to the heat exchanger plate 164. The first attachment features 170 may be configured as clip arms 174 having a half-arrow head profile, and the second attachment features 172 can be provided by a slot 180 formed through the heat exchanger plate 164 or an edge of the heat exchanger plate 164. The first attachment features 170 extend from sidewalls 157 of each battery assembly 125A, 125B and through the slot 180 of the heat exchanger plate 64. Once through the slot 180, the first attachment features 170 can each engage a respective one of the second attachment features 172 such that overhang surfaces 182 of the clip arms 174 abut against a lip 190 of the second attachment feature 172. The lip 190 may be established by depressions 192 formed in the heat exchanger plate 164. The depressions 192 aid in establishing internal channels 194 of the heat exchanger plate 164. Additional first attachment features 170 may engage additional lips 190 located at the outer periphery of the heat exchanger plate 164 in a similar manner as described above. Alternatively, additional attachment features of the tray 162 (e.g., similar to features 70A of FIGS. 2-6A) may engage the lips 190 located at the outer periphery of the heat exchanger plate 164. In such an embodiment, each of the tray 162, the heat exchanger plate 164, and the battery assemblies 125 may include attachment features for both securing the battery assemblies 125 to the tray 162 and thermally coupling the battery assemblies 125 to the heat exchanger plate 164.

Figure 9:
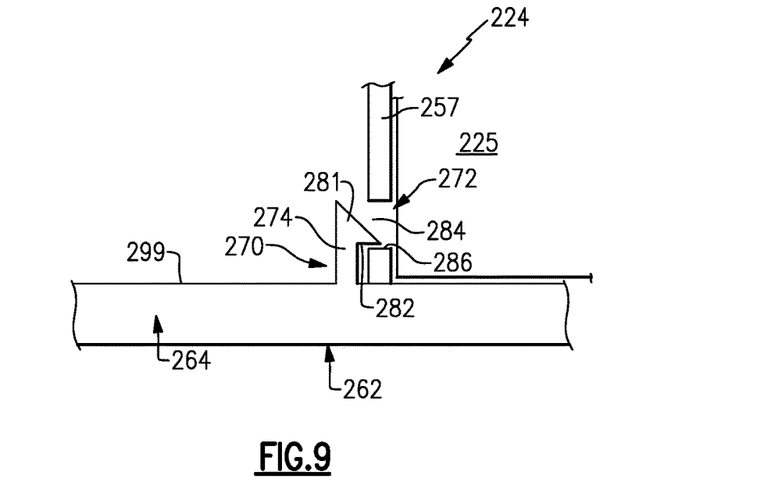
FIG. 9 illustrates yet another exemplary battery pack.

FIG. 9 illustrates portions of yet another exemplary battery pack 224. The battery pack 224 includes a tray 262, a heat exchanger plate 264, and at least one battery assembly 225 positioned to contact the heat exchange plate 264. In this exemplary embodiment, the heat exchanger plate 264 includes a first attachment feature 270 configured to engage a second attachment feature 272 of the battery assembly 225 for securing the battery assembly 225 relative to the heat exchanger plate 264. The first attachment feature 270 may be provided by a clip arm 274 and the second attachment feature 272 may be provided by an aperture 284. The clip arm 274 of the first attachment feature 270 protrudes upwardly from an outer surface 299 of the heat exchanger plate 264 and includes a hook portion 281 having an overhang surface 282 facing the tray 262. The second attachment feature 272 may be provided by an aperture 284 or slit disposed within a sidewall 257 of the battery assembly 225. When the battery assembly 225 is in the installed position shown in FIG. 9, the first attachment features 270 engages the second attachment features 272 such that the hook portion 281 extends into the aperture 284 and the overhang surface 282 rests against a surface 286 of the second attachment feature 272 that circumscribes the aperture 284.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   a tray;
   a heat exchanger plate atop a floor of said tray and having a first attachment feature; and
   a battery assembly having a second attachment feature configured to engage said first attachment feature as said battery assembly is moved against said heat exchanger plate to thermally couple said battery assembly to said heat exchanger plate,
   wherein said heat exchanger plate is positioned between said tray and said battery assembly,
   wherein said tray includes a third attachment feature configured to engage a fourth attachment feature of said battery assembly.

2. The battery pack as recited in claim 1, wherein said first attachment feature includes a clip arm and said second attachment feature includes an aperture.

3. The battery pack as recited in claim 2, wherein a hook portion of said clip arm is received in said aperture.

4. The battery pack as recited in claim 3, wherein an overhang surface of said hook portion abuts a surface that circumscribes said aperture.

5. The battery pack as recited in claim 2, wherein said clip arm protrudes upwardly from an outer surface of said heat exchanger plate and said aperture is formed in a sidewall of said battery assembly.

6. The battery pack as recited in claim 1, wherein said first attachment feature is flexible between a first position in which said first attachment feature is engaged with said second attachment feature and a second position in which said first attachment features is disengaged from said second attachment feature.

7. The battery pack as recited in claim 1, wherein said first attachment feature is a slot and said second attachment feature is a clip arm.

8. The battery pack as recited in claim 7, wherein said slot is formed through said heat exchanger plate and said clip arm protrudes from a sidewall of said battery assembly.

9. The battery pack as recited in claim 8, wherein a hook portion of said clip arm is received through said slot.

10. The battery pack as recited in claim 9, wherein an overhang surface of said hook portion abuts against a lip of said heat exchanger plate.

11. The battery pack as recited in claim 1, wherein said third attachment feature includes a clip arm and said fourth attachment feature includes an aperture formed in a sidewall of said battery assembly.

12. The battery pack as recited in claim 1, wherein said first attachment feature is an elongated slot formed entirely through the heat exchanger plate and the second attachment feature is a flexible clip arm configured to engage a surface of said heat exchanger plate that circumscribes said elongated slot.

13. A battery pack, comprising:
    a tray;
    a cold plate received against a floor of said tray;
    a battery array received against said cold plate;
    a first flexible clip arm of said tray engaging a first aperture formed in a sidewall of said battery array; and
    a second flexible clip arm extending from said floor, through a slot of said cold plate, and engaging a second aperture formed in a second sidewall of said battery array.

\* \* \* \* \*